INVENTOR.
William T. Graham
BY
ATTORNEYS.

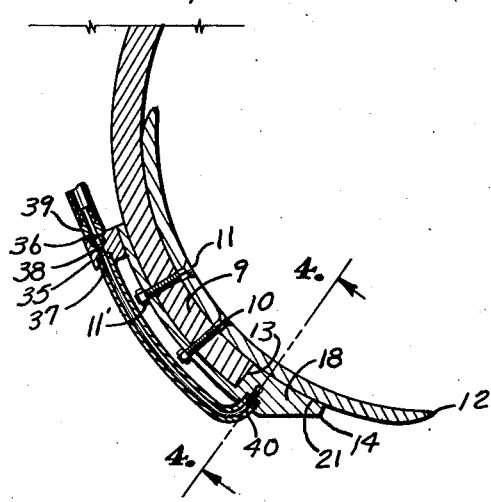
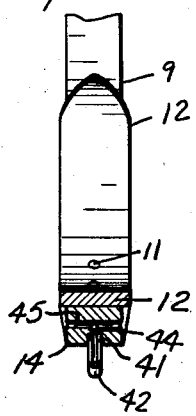
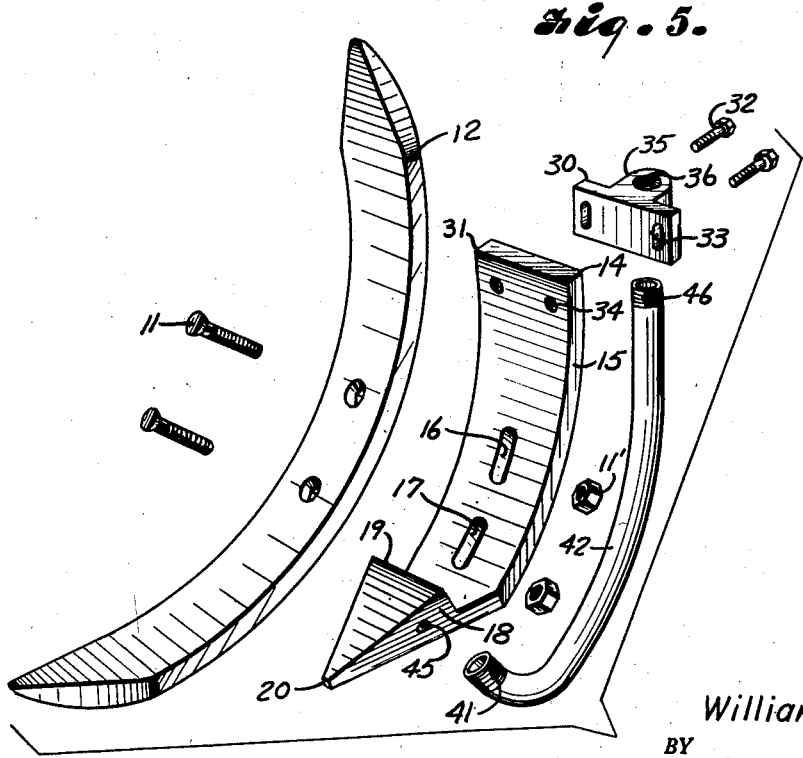

United States Patent Office 2,781,733
Patented Feb. 19, 1957

2,781,733

APPARATUS FOR DISPENSING MATERIAL BENEATH THE SHANK OF A GROUND-WORKING TOOL

William T. Graham, Amarillo, Tex.

Application August 12, 1953, Serial No. 373,805

2 Claims. (Cl. 111—7)

This invention relates to apparatus for dispensing anhydrous ammonia or other materials to the soil for fertilizing the same, and more particularly to apparatus for depositing such materials in the soil as the soil is being loosened by a plow of the chisel type.

It has been found that anhydrous ammonia, or other similar materials, are very useful as a fertilizer in various types of soil, but difficulties have been encountered in application of the anhydrous ammonia to the soil.

It is the principal object of this invention to provide apparatus for application of the anhydrous ammonia to the soil in the furrows made by the chisel plow.

Other objects of the present invention are to provide a shoe for the end of the shank of the chisel plow whereby the anhydrous ammonia may be supplied thereto and then to the soil from a source of supply carried by the frame of the plow; to provide means for supplying the anhydrous ammonia from the source of supply to the shoe; to provide means in the shoe for depositing the anhydrous ammonia in the furrow immediately behind the point of the chisel of the plow; to provide a shoe adjustable on the shank of the plow to accommodate chisels or shovels of various shapes and sizes; to provide resilient tubes or pipes connecting the source of supply with the shoes; to provide a detachable mounting for the shoe and tubes; and to provide a device of this character simple and efficient in operation.

In accomplishing these and other objects of the invention, I have provided an improved structure, the preferred forms of which are illustrated in the accompanying drawings, wherein:

Fig. 3 is an enlarged cross-sectional view of the lower end of the shank, chisel, shoe and tube for applying the anhydrous ammonia to the shoe.

Fig. 4 is a cross-sectional view taken on the line 4—4, Fig. 3.

Fig. 5 is a perspective view of the chisel, shoe, tube and parts for connecting the tube to the shoe shown in disassembled relation.

Referring more in detail to the drawings:

My invention is particularly adapted for use on plows of a type which include a plurality of laterally arranged ground conditioning tools that work under the surface to break the soil and form alternate ridges and furrows having exposed surfaces of the type disclosed in my Letters Patent of the United States No. 2,493,811.

Figure 1:
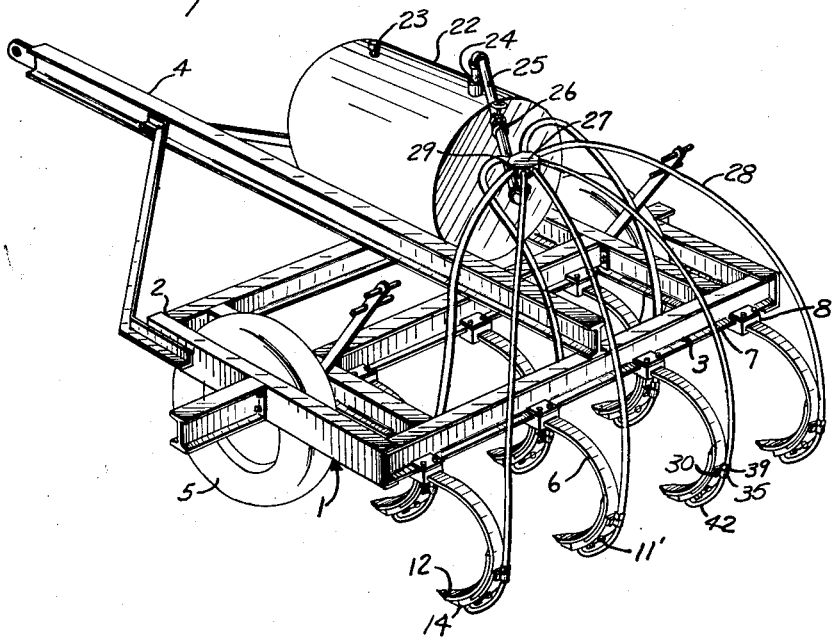
Fig. 1 is a perspective view of my invention mounted on a chisel plow.
Figure 2:
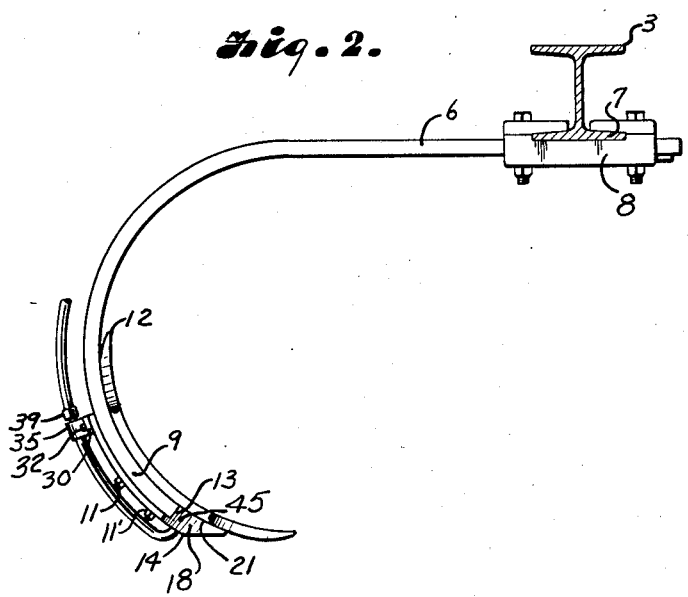
Fig. 2 is a side view of the shank of the plow showing the shoe and tube for feeding the anhydrous ammonia to the shoe.

1 designates a plow of the type referred to comprising a frame 2 consisting of transversely arranged I-beams 3, having a longitudinally arranged tongue 4, the frame being supported by wheels 5. The ground-working tools comprise a plurality of shanks 6 secured to the lower flange 7 of the I-beam 3 by clamps or the like 8. The lower ends 9 of the shanks 6 are provided with a plurality of openings 10 for receiving bolts or the like 11, for securing a chisel 12 to the lower end of the shank. The lower end of the shank has a plane surface 13 and the chisel 12 extends beyond the end of the shank as illustrated in Figs. 2 and 3.

The lower end 9 of the shank is slightly curved and a shoe 14 having a body 15 of substantially the same curvature of the shank is adapted to be secured thereto by bolts 11 extending through slots 16 and 17 in the shoe, the slots providing for adjustment of the location of the shoe on the shank. Nuts 11' are threaded on the bolts 11 to hold the shoe tightly in place on the body. The body 15 of the shoe is substantially curved in formation and has an enlarged end portion 18 having a shoulder 19 adapted to engage against the end 13 of the shank 6. The lower end of the shoe 14 is pointed, as indicated at 20, and lies against the lower rear face 21 of the chisel 12, as best illustrated in Figs. 2 and 3.

A tank 22 is provided and carried by the frame 2 of the plow and secured thereto in any suitable manner for carrying a supply of anhydrous ammonia, which may be supplied thereto by a connection 23. The tank has a connection 24 to which a pipe 25, having a valve 26, is provided, to which is attached a manifold or distributor connection 27. A plurality of tubes 28 have one of their ends attached to the distributor connection, as indicated at 29, and their other ends attached to a bracket or coupling member 30 secured to the upper end 31 of the shoe 14 by bolts 32 extending through slots 33 in the bracket and having their threaded ends engaged in threaded openings 34 in the shoe.

The bracket or coupling member 30 has an enlarged portion or lug 35 extending from its rear side and is provided on its respective ends with threaded sockets 36 and 37 connected by a passageway 38 extending through the lug. The ends of the tubes 28 are connected by male fittings 39 which are threaded into the sockets 36 of the bracket for securing the tubes 28 thereto.

The enlarged and tapered end 19 of the shoe 14 is provided with a threaded socket 40 adapted to receive the threaded end 41 of a pipe or tube 42, which is also curved to the shape of the shank and shoe and has its end 41 turned laterally to extend into the socket 40. A passageway 44 has one end connecting the socket 40 and its other end connecting laterally directed passageways 45 which extend to the side surface of the tapered, enlarged end 19 of the shoe, as best illustrated in Fig. 4. The upper end of the pipe 42 is threaded, as indicated at 46, and is adapted to engage in the threaded socket 37 of the bracket, Fig. 3.

In assembling the pipe 42 and coupling member 30 and fastening the same to the shoe 14, the threaded end 41 of the pipe 42 is threaded into the socket 40 of the shoe. The threaded socket 37 of the coupling member 30 is threaded onto the threaded end 46 of the pipe 42 and the bracket then secured to the shoe by the studs 32. The male fittings 39 on the ends of the tubes 28 are then threaded into the sockets 36 of the coupling member 30.

Operation of the apparatus constructed and assembled and described is as follows:

As the plow is being propelled across the field, the shanks will enter the soil at the desired depth, and opening of the valve 26 in the line 25 will admit the anhydrous ammonia or outer chemical to the tubes 28 for supplying the same to the shoe and more particularly to the lateral passageways 45 in the enlarged end of the shoe so that the ammonia will be emitted from the respective sides thereof in the furrow made by the chisel, or other tool, on the shank of the plow and the loosened soil will fall on the material covering the same. The amount of material deposited in the soil may be regulated by the valve 26.

It will be obvious from the foregoing that I have provided improved apparatus for dispensing and depositing anhydrous ammonia or other chemical in the soil for fertilizing the same.

What I claim and desire to secure by Letters Patent is:

1. A device for attachment to the lower end of the shank of a ground-working tool of a chisel-type plow for depositing anhydrous ammonia fertilizer or the like from a source of supply carried by said plow into the furrow made by the ground-working tool comprising, a shoe, means for adjustably attaching said shoe to said shank, said shoe conforming to the shape of said shank and having an enlarged end portion provided with a shoulder engaging the end of said shank and tapered forwardly to a point to lie along the underneath side of the ground-working tool, said shoulder on the shoe being of the same size as the end of the shank to provide a smooth surface for attaching the ground working tool, said shoe having a socket on the rear face of said enlarged end portion and having a passageway connecting with lateral passageways leading to the respective sides of said enlarged portion, a coupling member secured to the upper end of said shoe, a pipe leading from the coupling member to the socket in said shoe, and means connecting said source of supply of said fertilizer to said coupling member, said ground-working tool being of a width to overlie the openings in the tapered sides of the enlarged end of the shoe to prevent clogging of said openings.

2. A device for attachment to the lower end of the shank of a chisel type plow including a chisel on said shank for depositing anhydrous ammonia fertilizer or the like from a source of supply carried by said plow to the furrow made by the chisel on said shank comprising, a shoe having a body provided with vertically spaced slots and laterally spaced threaded openings near its upper end, bolts extending through said slots adjustably securing the shoe to the shank and chisel, said shoe being of the same width and conforming in curvature to said shoe, said shank being enlarged in thickness at its lower end providing a shoulder of the same thickness of the lower end of the shank and the thickened portion being tapered forwardly to a point and engaging the underface of said chisel, said shoe having a threaded socket on the rear face of the thickened portion and having connection with lateral passageways leading to the respective sides of said thickened portion, a coupling member having a threaded opening therethrough and ears having slots mating with the spaced threaded openings in the shank of said shoe, set screws extending through said slots in said ears and engaging said threaded openings in the threaded openings of the shank of said shoe adjustably securing said coupling thereto, a pipe having one end turned laterally and having threads for engaging in the threaded socket in said shoe and having its other end threaded and engaging said coupling, and means connecting said source of supply of said fertilizer to said coupling, said chisel being of a width to overlie the openings in the tapered sides of the thickened end of the shoe to prevent clogging of said openings.

References Cited in the file of this patent

UNITED STATES PATENTS

| 803,549 | Burnett | Nov. 7, 1905 |
| 2,285,932 | Leavitt | June 9, 1942 |
| 2,619,054 | Bell | Nov. 25, 1952 |
| 2,650,556 | Turner | Sept. 1, 1953 |

FOREIGN PATENTS

| 23,036/29 | Australia | Oct. 15, 1929 |